United States Patent [19]

Press et al.

[11] Patent Number: 4,548,427

[45] Date of Patent: Oct. 22, 1985

[54] STRAIN ACCOMMODATING FLUID CONDUIT ASSEMBLY AND FITTING THEREFOR

[75] Inventors: Irving D. Press, West Orange; Charles S. Lane, Livingston, both of N.J.

[73] Assignee: UMC Industries, Inc., Stamford, Conn.

[21] Appl. No.: 313,161

[22] Filed: Oct. 20, 1981

Related U.S. Application Data

[63] Continuation-in-part of Ser. No. 295,384, Aug. 24, 1981, abandoned, which is a continuation-in-part of Ser. No. 237,280, Feb. 23, 1981, abandoned.

[51] Int. Cl.[4] .................................................. F16L 9/14

[52] U.S. Cl. ...................................... 285/55; 285/114; 285/258; 285/286; 285/302; 285/321; 285/347; 285/370; 285/93

[58] Field of Search ......... 285/55, 321, 302, DIG. 18, 285/301, 114, 236, 370, 347, 93, 31, 258, 286

[56] References Cited

U.S. PATENT DOCUMENTS

| | | | |
|---|---|---|---|
| 3,131,642 | 5/1964 | Geer et al. | 285/55 X |
| 3,142,498 | 7/1964 | Press | 285/DIG. 18 X |
| 3,190,374 | 6/1965 | Caperon et al. | 285/55 X |
| 3,203,662 | 8/1965 | Lau | 285/31 X |
| 3,416,819 | 12/1960 | Day | 285/302 |
| 3,822,412 | 7/1974 | Carlin et al. | 285/301 X |
| 4,293,150 | 10/1981 | Press | 285/258 X |
| 4,350,372 | 9/1982 | Logsdon | 285/301 X |

FOREIGN PATENT DOCUMENTS

| | | | |
|---|---|---|---|
| 1931008 | 12/1970 | Fed. Rep. of Germany | 285/55 |
| 1536180 | 8/1968 | France | 285/31 |
| 2229011 | 12/1974 | France | 285/302 |

*Primary Examiner*—Dave W. Arola

*Attorney, Agent, or Firm*—Hopgood, Calimafde, Kalil, Blaustein & Judlowe

[57] ABSTRACT

A conduit consisting of a metal tube, with or without a plastic tube liner, is rendered strain accommodating by securing to its ends fittings that have a first component part to one end of which is joined the usual male or female coupling means or other connector means and to the other end of which is joined a sleeve which, in turn, is connected either directly or through another component part to the metal tube end. Said sleeve is joined to the component part or parts with provision for limited axial and angular movement and a fluid-tight seal therebetween. The plastic lining tube when present may be independently connected to the first component part with a fluid-tight seal or may pass therethrough. Alternatively, a short section of plastic tubing is connected with fluid-tight seals between the two component parts when present or between the first component part and the sleeve. Thereby, the fittings can move through a restricted range relative to the metal tube while the plastic liner or tube section elastically accommodates such movement and fluid integrity is maintained independently by both the plastic and metal tubes.

31 Claims, 6 Drawing Figures

STRAIN ACCOMMODATING FLUID CONDUIT ASSEMBLY AND FITTING THEREFOR

BACKGROUND OF THE INVENTION

This application is a continuation-in-part of application Ser. No. 295,384, filed Aug. 24, 1981, now abandoned, which is a continuation-in-part of application Ser. No. 237,280, filed Feb. 23, 1981, now abandoned.

The present invention relates to fittings for a fluid conduit and to the fluid conduit assemblies formed therefrom.

In the aircraft industry, particularly in connection with aircraft engines, there has developed a need for a fluid conduit having certain functional characteristics that cannot be obtained without paying a severe and undesirable penality in weight, size, cost or combinations thereof. For example, gas turbine engines are being built at present to extreme tolerances in order to permit use of rigid tube point-to-point plumbing. Rigid tubing is considered by many in the industry as a must for handling critical fluids such as fuel. The reasons are based upon such considerations as fire resistance, resistance to inadvertent puncturing and the like. In general, aircraft engine designers tend to believe that metal tubing is more reliable than flexible hose. However, metal tubing is stress sensitive and the engine designers have elected to resort to holding tolerances between tube connecting points to very close limits in order that the metal tube assemblies would not be subjected to significant stress when assembled in place. Such practice is obviously costly. Moreover, during engine operation there is constant thermal expansion and contraction to be contended with. Thus, expensive expedients have been adopted heretofore such as including expansion loops, dogleg bends, or even bellows sections in the metal tubing to solve the problem, which problem is further complicated by the frequent requirement due to safety considerations for redundancy in such fluid conduits.

One answer to the redundancy requirement can be found disclosed and claimed in U.S. Pat. No. 4,293,150, issued Oct. 6, 1981 on an application of Irving D. Press, entitled "FLUID CONDUIT ASSEMBLY" and assigned to the same assignee as the present invention. Said prior patent describes a fluid conduit assembly having at least two snug-fitting concentric pipes each of which is independently impervious to fluid. End fittings are secured to each end of the conduit and have separate portions joined, respectively, to a different one of both of the pipes with a separate fluid tight seal therebetween. The outer pipe is metallic while the inner pipe is non-metallic.

Although said prior patent discloses an answer to the redundancy problem, it does not answer the close tolerance and thermal expansion and contraction problems. It is the present invention that seeks to answer these unsolved problems.

SUMMARY OF THE INVENTION

In accordance with one aspect of the present invention there is provided a fitting for a fluid conduit assembly in which the conduit includes at least a fluid impervious solid metallic tube, said fitting comprising a component part having means at one of its ends for connecting said fitting to another element, additional means located at the other end of said component part for attachment to an end of said metallic tube with a fluid-tight connection, said additional means being joined to said component part with provision for limited movement therebetween, and means for independently attaching the interior of said component part with a fluid-tight seal to an end of a non-metallic fluid impervious tube where said non-metallic tube is sized to make a substantially snug fit within said additional means and projects therefrom into said component part.

In accordance with another aspect of the present invention there is provided a fluid conduit assembly comprising a fluid conduit with fittings at opposite ends, said conduit including at least two snug-fitting concentric tubes each of which is independently impervious to fluid, the outermost being solid metallic and the innermost being non-metallic, and said fittings each has separate portions joined, respectively, to a different one of both of the tubes with a separate fluid-tight seal therebetween, characterized in that said outermost tube is joined to said fittings by means permitting limited movement between the ends of said outermost tube and the respective associated fitting, and said innermost tube is constructed and arranged to accommodate any movement between said outermost tube and said fittings.

Although the invention is described herein with reference to a very specific plumbing situation, it is being so described as a matter of convenience. It should be understood that the invention has varied applicability and is not limited to conduits for use on aircraft engines.

BRIEF DESCRIPTION OF THE DRAWINGS

The invention will be better understood after reading the following detailed description of the presently preferred embodiments thereof with reference to the appended drawings in which.

The same reference numerals are used throughout the drawings to designate the same or similar parts.

DESCRIPTION OF THE PREFERRED EMBODIMENTS

Figure 1:
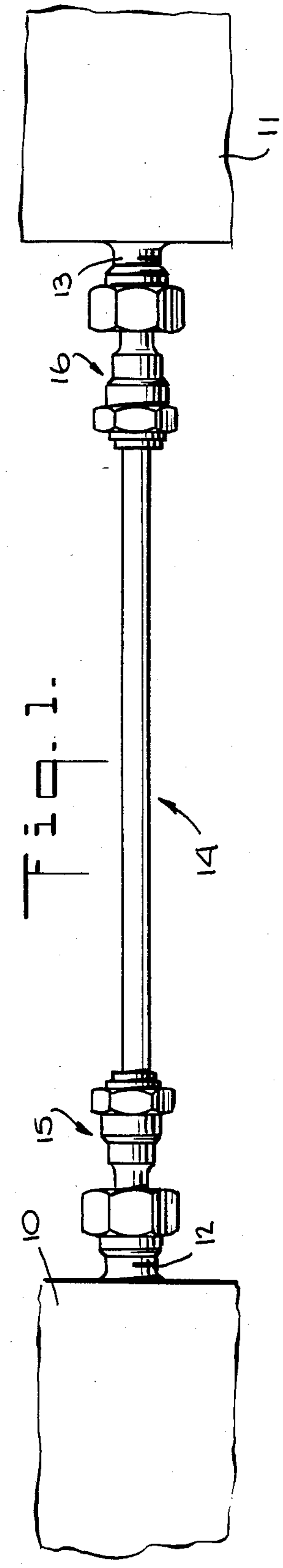
FIG. 1 is a fragmentary view of portions of an aircraft turbine engine housing between which is installed a fluid conduit assembly embodying the present invention.

Referring now to FIG. 1 of the drawings there is shown therein fragments of an engine housing at 10 and 11, each provided with an externally threaded male boss or nipple 12 and 13, respectively. A fluid conduit assembly, designated generally by the numeral 14 and provided with female type end fittings 15 and 16, is connected by said fittings to the bosses or nipples 12 and 13, respectively.

Figure 2:
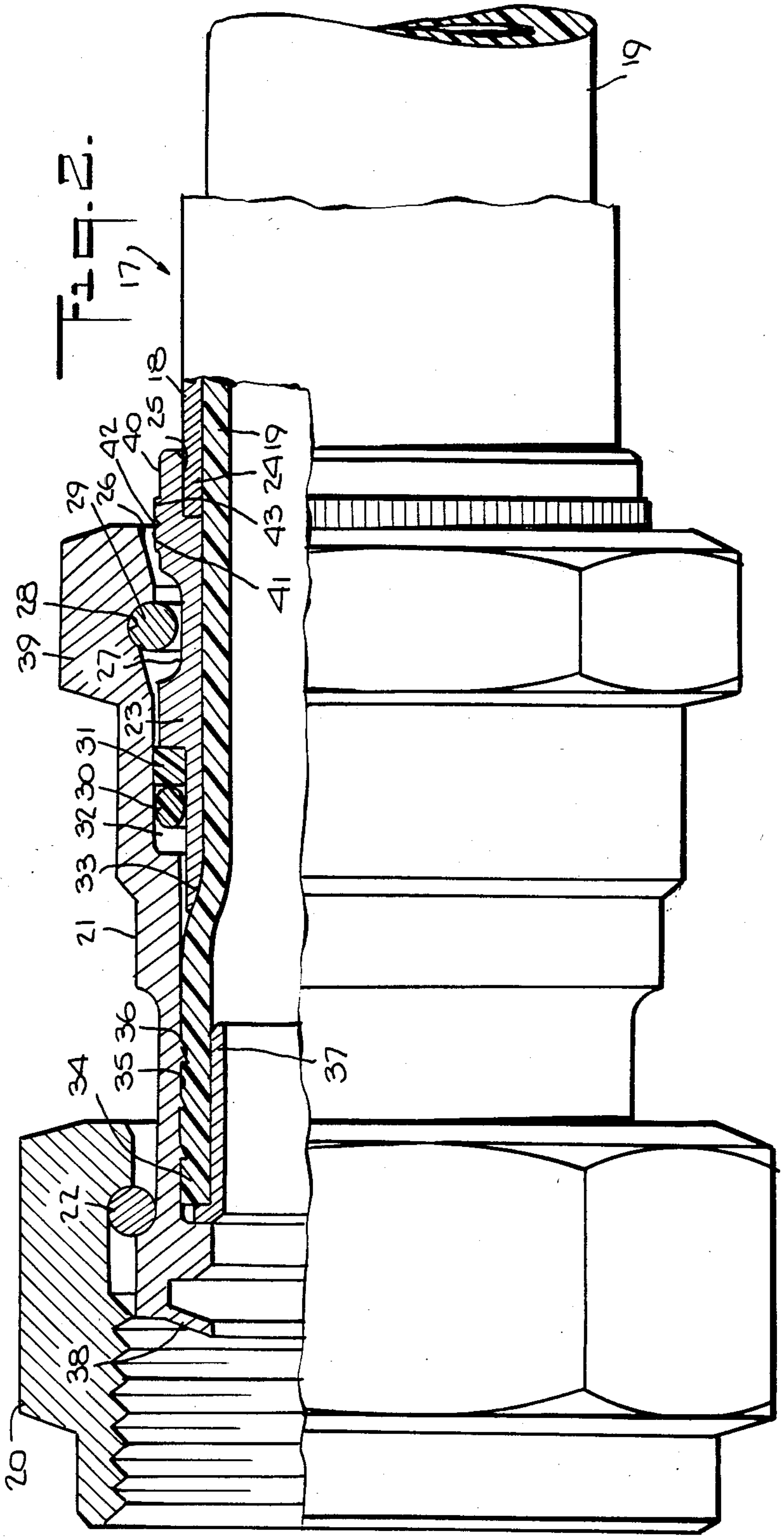
FIG. 2 is an enlarged view of one end of the fluid conduit assembly of FIG. 1 with portions broken away revealing the details thereof.

Details in construction of the end fittings 15 and 16 can be seen in FIG. 2, both fittings being identical. As shown therein, the conduit assembly includes a conduit 17 consisting of two snug-fitting concentric tubes 18 and 19. Each of the tubes 18 and 19 is independently impervious to fluid, the outermost tube 18 being solid metallic and the innermost tube 19 being non-metallic. More specifically, the tube 18 may be formed from stainless steel while the tube 19 may be formed from polytetrafluoroethylene (hereinafter abbreviated "PTFE"). A suitable method for fabricating the tube 19 is described in United States Walker et al. U.S. Pat. No. 2,752,637 issued July 3, 1956 and entitled "Extrusion of Polytetrafluoroethylene". A suitable method for installing the PTFE tube 19 within the steel tube 18 is described in United States St. John et al. Pat. No. 3,050,786 issued Aug. 28, 1962 and entitled "Methods of Lining and Jacketing Tubular Members with Prestressed Polytetrafluoroethylene".

The end fitting includes at one of its ends means for connecting it to another element, in the subject example the boss or nipple 12 or 13. Such means consists of the swivel nut 20 mounted upon an end of a component part 21 and retained thereon by a staking or retention wire 22. Additional means consisting of a metallic sleeve 23 is provided for attachment to an end 24 of the outermost tube 18, for example, by brazing said tube end 24 within the counterbore 25. The sleeve 23 is disposed with a loose sliding fit within a bore 26 passing through the component part 21. As seen in FIG. 2, the outside of said sleeve is provided with a circumferential groove 27 confronting a circumferential groove 28 on the inside of the bore 26. A staking or retention wire 29 is disposed in said grooves 27 and 28 to secure the sleeve 23 within the component part 21. One of the grooves 27 or 28, in this case groove 27, has a greater dimension in the direction axially of the fitting whereby limited axial movement is permitted between sleeve 23 and component part 21. Moreover, the outside diameter of sleeve 23 is made smaller than the diameter of bore 26 where the parts overlap in order to permit slight angular movement between sleeve 23 and component part 21. In an example of this embodiment, approximately $\pm 0.050''$ axial movement is permitted between parts 23 and 21 while about $\pm 1\frac{1}{2}°$ angular motion therebetween is tolerated. However, more or less axial and angular movement can be designed into the fitting as will be apparent to those skilled in the art.

Fluid sealing means in the form of an elastomeric O-ring 30 backed up by a split molded PTFE ring 31 disposed within a circumferential pocket 32 formed between sleeve 23 and component part 21 serves to establish a fluid-tight seal therebetween. As seen in the drawing, the back-up ring 31, being relatively incompressible, will tend to function as a fulcrum for angular movement of sleeve 23 within the bore 26. In this regard, notice should be taken of the clearance between wire 29 and groove 27.

As shown, the inside diameter of sleeve 23 is chosen preferably to coincide with the inside diameter of tube 18 thereby providing a smooth continuation thereof for liner tube 19. However, the end of sleeve 23 has its inside diameter tapered at 33 in order to provide a gradual and smooth transition surface to the portion of bore 26 that directly receives the extending end 34 of the PTFE tube 19. In the region 35, the bore 26 of component part 21 is interrupted by circumferential barbs 36. A radially expanded metal insert 37 disposed within the end 34 of tube 19 compresses such tube end against the barbs 36 both capturing the same and establishing a fluid-tight lip seal therebetween. A dynamic metallic lip seal 38 is formed on the extreme end of component part 21 within nut 20 for establishing a fluid-tight joint with the male boss or nipple all in a well known manner. See for example, U.S. Press Pat. No. 3,083,989 issued Apr. 2, 1963 and entitled "Reusable Fitting with Metallic Sealing Ring."

The component part 21 is provided at 39 with wrench flats to permit immobilizing part 21 against rotation when nut 20 is being manipulated to make up the joint with the male element, e.g., boss or nipple 12 or 13.

The outer end 40 of sleeve 23 projects from component part 21, and two circumferential zones 41 and 43 spaced by a groove 42 are provided thereon with a knurled surface to serve as indicia of the relative axial position of sleeve 23 within the bore 26. With this indicator available, the installer of the conduit assembly can verify that the limits of available movement have not been reached. Alternatively, it can be used to verify that a certain bias is present upon initial installation to accommodate anticipated strains resulting from use.

A suitable assembly sequence would be to secure the sleeves 23 on the ends of the metal tube 18 prior to installing the PTFE liner tube 19. Thereupon, the insert 37 in unexpanded condition is disposed within the end 34 of tube 19. The O-ring 30 and back-up ring 31 are installed on sleeve 23 whereupon the component part 21 is pressed on over end 34 of tube 19. Staking wire 29 is inserted in known manner and insert 37 is radially expanded. Finally, nut 20 is placed in position and wire 22 is installed in known manner.

When the conduit assembly 14 is installed and in operation, the PTFE tube 19 has sufficient elasticity to expand or contract, as the case may be, with axial movement of sleeve 23 relative to component part 21. At least, that is the case for the $\pm 0.050''$ axial movement that is designed into this example. If necessary, the end fittings can be assembled to the conduit ends with sleeve 23 within bore 26 to the limit of its inward travel restrained by wire 29. The dimensioning of the assembly, however, can be such that under nominal installed conditions the sleeve 23 will assume an intermediate axial position relative to component part 21, or an end limit condition, as desired. Preferably, liner tube 19 should be under slight tension in the nominal position as installed.

Figure 3:
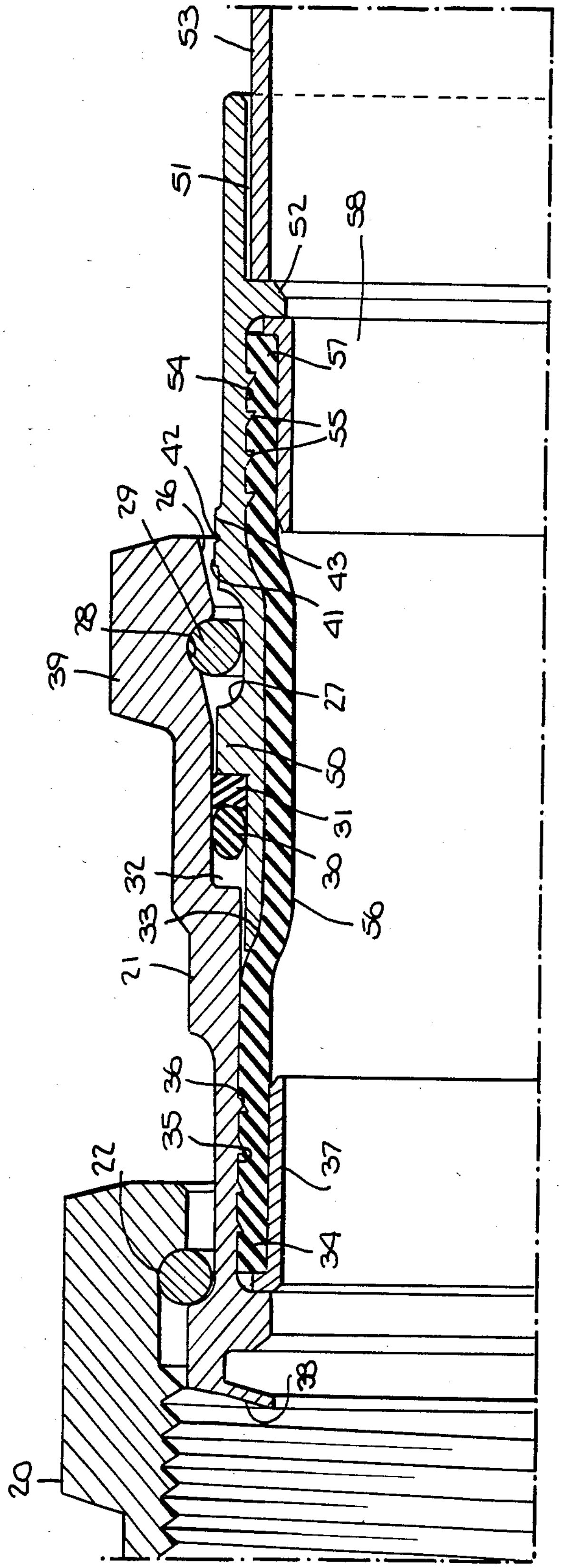
FIG. 3 is a view similar to that of FIG. 2 and showing a modified fitting and conduit assembly.

If additional fire resistance is required, it may be achieved by replacing the elastomeric O-ring 30 with a graphitic high temperature fibre material or the like. If additional scuff resistance is needed on the outer surface of tube 19 where it is engaged by the nose 33 of sleeve 23, it can be obtained by incorporating a suitable filler in the outer surface layer of tube 19 by a concentric extrusion process in known manner. Such filler can also enhance the bridging strength of tube 19 if tube 18 should develop stress cracks or the like.

Where redundancy is not required in the conduit resort may be had to the embodiment of the invention illustrated in FIG. 3 to which attention should now be directed. The elements 20, 21, 22, 29, 30, 31, and 37 are identical to those described with reference to FIG. 2. However, the additional means for joining the fitting to the conduit, namely the metallic sleeve 50, is differently constructed to the right of the groove 27 as viewed in FIG. 3. That is, the sleeve, now designated generally by the reference numberal 50, is extended to the right and provided with a counterbore section 51 terminating at an internal shoulder 52 for receiving the end of a solid metal tube conduit 53. The tube 53 can be brazed or similarly united to the sleeve 50. The interior of sleeve 50 is provided to the left of shoulder 52 in the region 54 with an enlarged diameter and spaced circumferential barbs 55 dimensioned and configured as a mirror image to region 35 of component part 21. A short section of PTFE tubing 56 takes the place of the projecting tube liner 19 of FIG. 2 and has its end 57 squeezed into fluid-sealing contact with barbs 55 by a radially expanded metal insert 58. Insert 58 is preferably identical to insert 37 but oriented in the opposite direction during assembly. It is contemplated that groove 27 will be dimensioned relative to wire 29 to permit ±0.0625" axial movement of sleeve 50 relative to part 21 and ±2° angular movement. However, these dimensions should only be considered as exemplary.

A suitable assembly sequence would be to fit the inserts 37 and 58 into the opposite ends of the tube section 56. Position back-up ring 31 and O-ring 30 on sleeve 50 and telescope the latter over the end 57 of tube 56 until shoulder 52 abuts insert 58 which is still in its unexpanded condition. Now component part 21 is pressed on over end 34 of tube 56. Staking wire 29 is inserted in known manner and inserts 37 and 58 are both radially expanded, preferably in a single operation with an extended tool. Finally, nut 20 is placed in position and wire 22 is installed in known manner.

It should be appreciated that the end fitting is now a complete unit fully assembled. As such, the fittings can be attached to the ends of metal tubing by applying a suitable chill block to the exterior of sleeve 50 to the left of shoulder 52 while the counterbore section 51 is brazed to the end of a metal conduit. The chill block will prevent degradation of the end 57 of tube 56 while brazing is being accomplished.

The embodiment illlustrated in FIG. 3 is provided with a threaded connector for coupling the fitting to a member other than a metallic tube. However, the invention is admirably suited for application to a union type fitting for joining two metallic tubes. Especially in those situations that require the introduction of a fitting into an existing plumbing line capable of affording a definite but limited degree of articulation, it will be found that the fitting shown in FIG. 4 will be preferred. In essence, the structure common to the fittings of FIGS. 2 and 3 that provides for the relative movement is combined with two welding or brazing collars or the like for interposition between two sections of metal tubing. Thus, in a retrofit situation, for example, the existing end fittings on the line may be left in place and the line may be cut at one or more convenient locations whereupon fittings as shown in FIG. 4 can be installed to reunite the cut ends.

Figure 4:
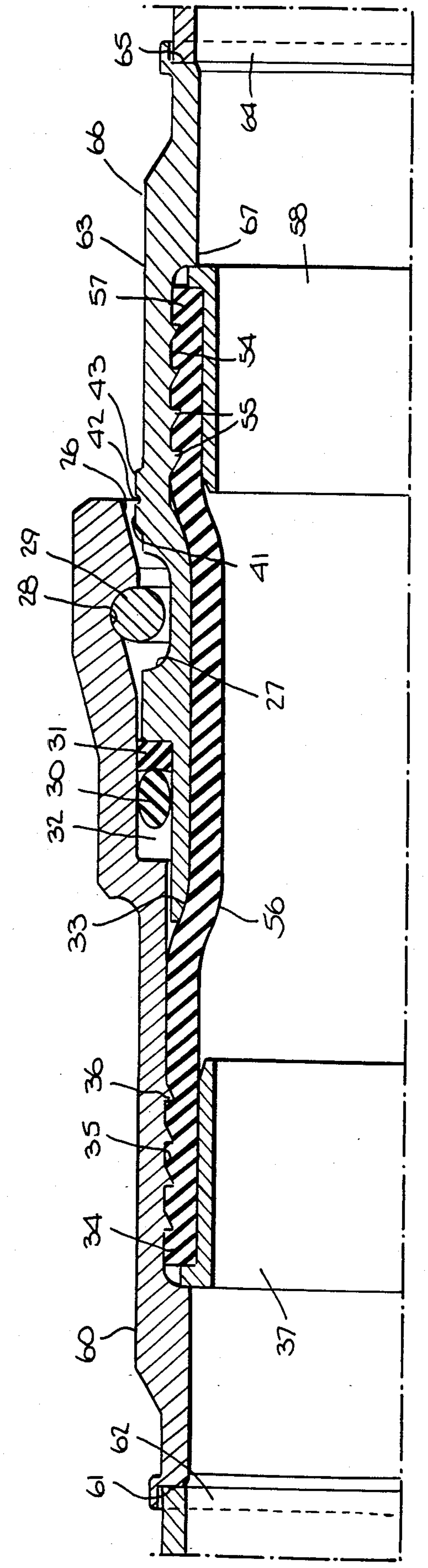
FIG. 4 is a view similar to that of FIG. 2 but of a further modified fitting for use between two sections of tubing.

Referring to FIG. 4, the fitting includes a component part 60 provided at one of its ends with a counterbore 61 for receiving the end 62 of a first section of metal tubing. The design of the counterbore 61 and adjacent portions of the fitting part 60 will be recognized as intended for welding the fitting to the tubing. Obviously any other suitable method of joining the fitting part 60 to the tube end 62 may be utilized. Additional means consisting of the metallic sleeve 63 is provided for attachment to an end 64 of another section of metal tubing. In this example, the end of sleeve 63 is provided with a counterbore 65 for receiving the tube end 64 and for welding thereto in manner similar to that of tube end 62 in counterbore 61.

The sleeve 63 is disposed with a loose sliding fit within a bore 26 passing through the component part 60. As seen in FIG. 4, the outside of said sleeve 63 is provided with a circumferential groove 27 confronting a circumferential groove 28 on the inside of the bore 26. A staking or retention wire 29 is disposed in said grooves 27 and 28 to secure the sleeve 63 within the component part 60. One of the grooves 27 or 28, in this case groove 27, has a greater dimension in the direction axially of the fitting whereby limited axial movement is permitted between sleeve 63 and component part 60. Moreover, the outside diameter of sleeve 63 is made smaller than the diameter of bore 26 where the parts overlap in order to permit slight angular movement between sleeve 63 and component part 60. In an example of this embodiment, approximately, ±0.050" axial movement is permitted between parts 63 and 60 while about ±1½° angular motion therebetween is tolerated. However, more or less axial and angular movement can be designed into the fitting as will be apparent to those skilled in the art.

Fluid sealing means in the form of an elastomeric O-ring 30 backed up by a split molded PTFE ring 31 disposed within a circumferential pocket 32 formed between sleeve 63 and component part 60 serves to establish a fluid-tight seal therebetween. The back-up ring 31, being relatively incompressable, will tend to function as a fulcrum for angular movement of sleeve 63 within the bore 26. In this regard, notice should be taken of the clearance between wire 29 and groove 27.

As shown, the inside diameter of sleeve 63 is chosen preferably to coincide with the inside diameters of tubes 62 and 64. However, the inner end of sleeve 63 has its inside diameter tapered at 33 in order to provide a gradual and smooth transition surface to the portion of bore 26 that directly receives the extending end 34 of the short section of PTFE tubing 56. In the region 35, the bore 26 of component part 60 is interrupted by circumferential barbs 36. A radially expanded metal insert 37 disposed within the end 34 of tubing 56 compresses such tube end against the barbs 36 both capturing the same and establishing a fluid-tight lip seal therebetween.

The outer end 66 of sleeve 63 projects from component part 60, and two circumferential zones 41 and 43 spaced by a groove 42 are provided thereon with a knurled surface to serve as indicia of the relative axial position of sleeve 63 within the bore 26. With this indicator available, the installer of the conduit assembly can verify that the limits of available movement have not been reached. Alternatively, it can be used to verify that a certain bias is present upon initial installation to accommodate anticipated strains resulting from use.

The interior of sleeve 63 is constructed similar to that of sleeve 50 in FIG. 3 and provided with a shoulder 67 at the end of a region 54 having an enlarged diameter and spaced circumferential barbs 55 dimensioned and configured as a mirror image to region 35 of component part 60. The short section of PTFE tubing 56 has its end 57 squeezed into fluid-sealing contact with barbs 55 by a radially expanded metal insert 58. Insert 58 is preferably identical to insert 37 but oriented in the opposite direction during assembly.

A suitable assembly sequence would be to fit the inserts 37 and 58 into the opposite ends of the tube section 56. Position back-up ring 31 and O-ring 30 on sleeve 63 and telescope the latter over the end 57 of tube 56 until shoulder 67 abuts insert 58 which is still in its unexpanded condition. Now component part 60 is pressed on over end 35 of tube 56. Staking wire 29 is inserted in known manner and inserts 37 and 58 are both radially expanded, preferably in a single operation with an extended tool.

It should be appreciated that the fitting is now a complete unit fully assembled. As such, the fitting can be attached to the ends 62 and 64 of the metal tubing by applying a suitable chill block to the exterior of sleeve 63 to the left of shoulder 67 while the counterbore section 65 is welded to the end of the metal conduit. The chill block will prevent degradation of the end 57 of tube 56 while welding is being accomplished. Similarly, the counterbore section 61 is welded to tube end 62 with a chill block surrounding the component part 60 over the region 35. The embodiment of FIG. 4 functions in much the same manner as the embodiments of FIGS. 2 and 3.

Figure 5:
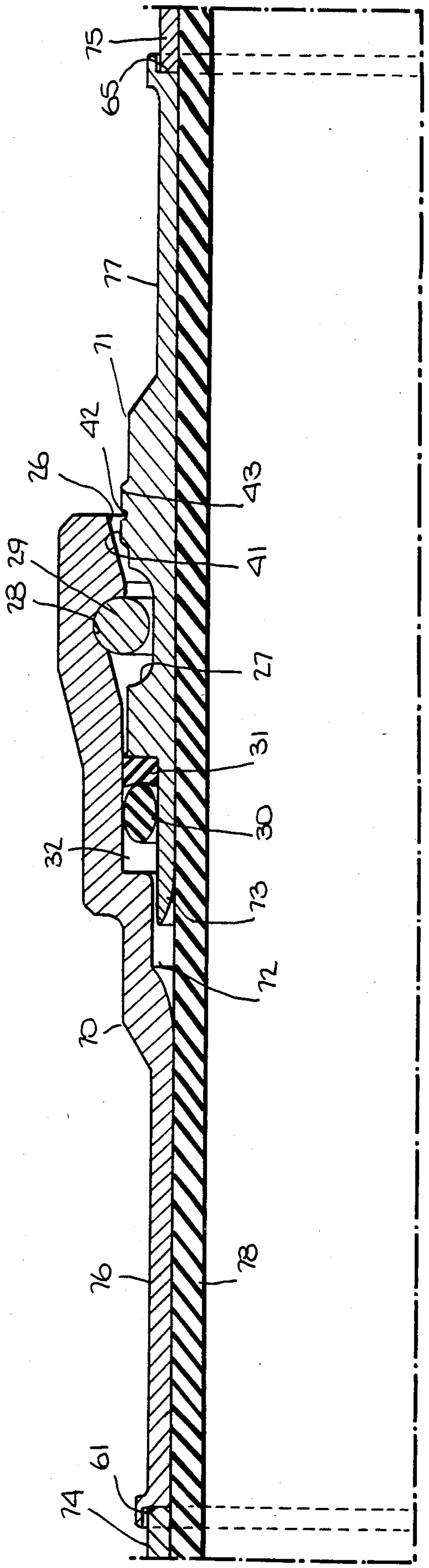
FIG. 5 is a view similar to that of FIG. 4 but of yet another modification of the invention.

If complete redundancy is required, it is possible in certain situations to make use of the fitting embodiment shown in FIG. 5 to which attention should now be directed. The fitting consists of a component part 70 and a sleeve 71 joined by staking wire 29 cooperating with grooves 27 and 28 in precisely the same manner as the preceding embodiments. A fluid-tight seal between the parts 70 and 71 is provided by the O-ring 30 and back-up ring 31 in pocket 32. The indicator components 41, 42 and 43 are also the same. However, the component part 70 is provided with a counterbore 72 for receiving the end 73 of the sleeve 71, with both having a slight internal taper. The parts 70 and 71 are otherwise provided with uniform inner diameters of equal dimension and equal to the inner diameter of the metal tubes 74 and 75 so as to provide one continuous smooth and uniform bore when joined to said tubes 74 and 75. The outer ends of parts 70 and 71 are provided with welding counterbores 61 and 65, respectively, similar to those shown in FIG. 4. For conservation of weight, the outside diameters of the parts 70 and 71 may be reduced in the regions 76 and 77, as shown.

It is contemplated that the metal tubes 74 and 75 will be joined by the fitting parts 70 and 71, or several sections of metal tubing will be joined by similar fittings, whereupon the entire assembly will be lined by a tube 78 of PTFE by drawing the liner down and pulling it through the conduit in known manner. Thereafter, the lined and slightly articulable conduit may be bent and shaped in the regions between the fittings in any well known manner as desired. The ends of the thus formed conduit may be provided with end fittings of the type shown in FIG. 2.

Under certain circumstances it may be desired to introduce greater flexibility in the line than can be obtained with the embodiments described above. While the dimensions can be altered to provide greater clearance for increased range of movement, this may not be desirable. As an alternative, the embodiment illustrated in FIG. 6 may be used to advantage. For one thing, the embodiment of FIG. 6 may be evolved from the parts used in the embodiment of FIG. 4 with a minimum of change. Comparing the two figures it will be seen that the embodiment of FIG. 6 may contain two identical component parts 60 with two staking wires 29, two O-rings 30, two split PTFE back-up rings 31, and two metal inserts 37, all the same as the corresponding parts in FIG. 4. Cooperating with the foregoing parts is a new sleeve 80, the lefthand end of which as viewed in the drawing may be identical with the part 63 in FIG. 4 on its O.D. up to the knurled zone 43, and on its I.D. up to the region beneath groove 27. The righthand half of sleeve 80 is now a mirror image of the lefthand half about a transverse plane. Since the parts of sleeve 80 are essentially the same on the right as on the left, those on the right are designated by the same reference numerals followed by the letter "A". All of the other parts are mounted with the same mirror symmetry and a lining tube 81 of PTFE extends between the cavities 35 in the respective component parts 60. The assembly and operation of the fitting of FIG. 6 is substantially the same as that of the fitting of FIG. 4, and to the extent that they differ such differences should be self-evident.

Figure 6:
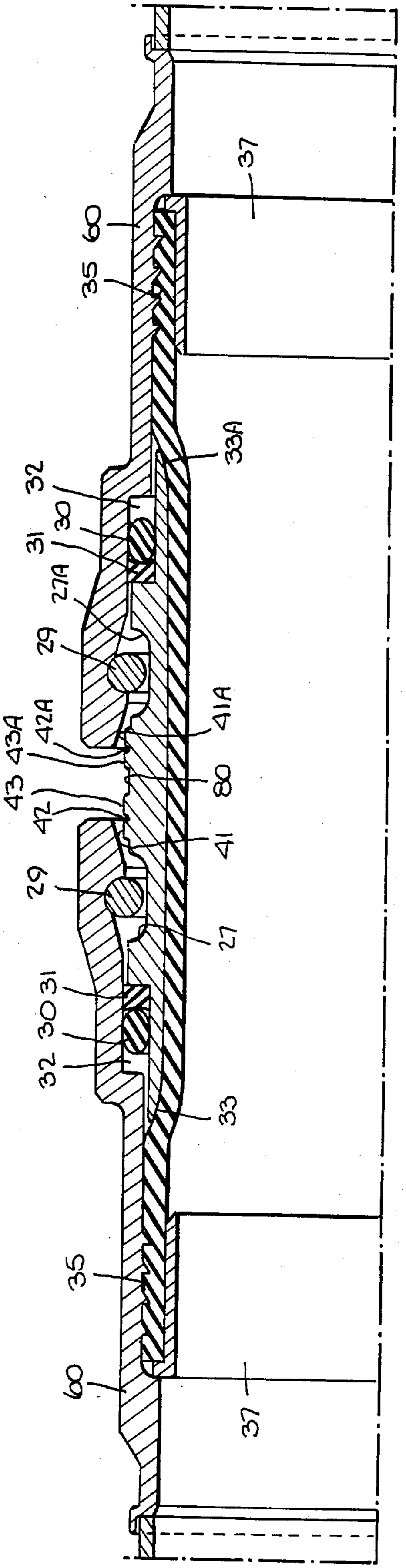
FIG. 6 is a view similar to that of FIG. 4 showing yet another modification of the invention.

It should be understood that the principle of doubling up as shown in FIG. 6 can be applied to any of the embodiments described herein and is not limited to modification of the embodiment of FIG. 4.

While the embodiments illustrated and described herein by way of example show the fittings being secured to the metal conduits by brazing or the like, it is to be understood that any form of attachment may be employed with appropriate known modification of the connecting portion of the fitting. That is, various modes of mechanical attachment, welding, bonding and so forth can be utilized with the subject invention.

Having described the invention with reference to the presently preferred embodiments thereof it will be understood by those skilled in the subject art that various changes in construction and materials may be effected without departing from the true spirit of the invention as defined in the appended claims.

What is claimed is:

1. A fitting for a fluid conduit assembly in which the conduit includes at least a fluid impervious solid metallic tube, said fitting comprising a component part having at one of its ends means for connecting said fitting to another element, additional means located at the other end of said component part for attachment to an end of said metallic tube with a fluid-tight connection, means joining said additional means to said component part with provision for limited movement at least axially between said additional means and said component part, and means for independently attaching the interior of said component part with a fluid-tight seal to an end of a non-metallic fluid impervious tube where said non-metallic tube is sized to make a substantially snug fit within said additional means and projects therefrom into said component part, said component part and said additional means interfitting telescopingly and being configured such as to restrict, over the range of movement therebetween, the gap therebetween that is bridged by said non-metallic tube to prevent said non-metallic tube from being pinched in or extruded into said gap.

2. A fitting according to claim 1, wherein said means possessed by said component part for connecting said fitting to another element comprises a fitting end constructed and arranged to be attached to another metallic tube by brazing or the like.

3. A fitting according to claim 1, wherein said additional means comprises a metallic sleeve disposed with a loose sliding fit within a bore passing through said component part, and fluid sealing means disposed between said sleeve and said component part.

4. A fitting according to claim 3, wherein said metallic sleeve has an end facing outwardly from said bore which end is constructed and arranged to be attached to said metallic tube by brazing or the like.

5. A fitting according to claim 4, wherein said means posssessed by said component part for connecting said fitting to another element comprises a fitting end constructed and arranged to be attached to another metallic tube by brazing or the like.

6. A fitting according to claim 3, wherein said additional means further comprises a second component part having a bore passing therethrough, said metallic sleeve has an end facing outwardly from the bore in said first component part which end is disposed with a loose sliding fit within said bore of the second component part, means are provided interconnecting said end of said sleeve with said second component part for limiting the movement therebetween, fluid sealing means are disposed between said sleeve and said second component part, and said second component part at its end remote from said sleeve is provided with means for attaching said second component part to the end of said metallic tube with a fluid-tight connection.

7. A fitting according to claim 3, wherein a section of non-metallic fluid impervious tubing is disposed within both said metallic sleeve and said component part with one end of said tubing secured to the interior of said component part by said means for attaching said component part thereto, and said metallic sleeve is provided with means attaching to its interior with a fluid-tight seal the opposite end of said non-metallic tubing.

8. A fitting according to claim 7, wherein said metallic sleeve has an end facing outwardly from said bore which end is constructed and arranged to be attached to said metallic tube by brazing or the like.

9. A fluid conduit assembly comprising a fluid impervious solid metallic tube, at least one end of said tube having an end fitting secured thereto, said fitting having first and second parts, said first part having means at one of its ends for connecting said fitting to another element, the other end of said first part having said second part joined thereto with provision for limited movement at least axially between said parts, said second part having a portion away from said first part which portion is attached to an end of said metallic tube, a section of non-metallic fluid impervious tubing disposed within both of said parts and sized to make a substantially snug fit within said second part, and separate means securing the respective ends of said section of non-metallic tubing with an individual fluid-tight seal to the interior of said first and second part, respectively, said first and second part interfitting telescopingly and being configured such as to restrict, over the range of movement therebetween, the gap therebetween that is bridged by said non-metallic tubing to prevent said non-metallic tubing from being pinched in or extruded into said gap.

10. A fluid conduit assembly according to claim 9, wherein said second part fits within said first part with fluid sealing means disposed therebetween, and both said fluid sealing means and said non-metallic tubing are constructed and arranged to permit both axial and angular movement of limited extent between said parts.

11. A fluid conduit assembly according to claim 10, wherein said non-metallic tubing is fabricated from a fluorocarbon resin and its ends are squeezed between the interior wall of the corresponding part and a respective concentric radially expanded insert.

12. A fluid conduit assembly according to claim 11, wherein said second part is joined to said solid tube by brazing or the like.

13. A fluid conduit assembly according to claim 9, wherein said another element is another fluid impervious solid metallic tube, and said means possessed by said first part for connecting said fitting to said element is attached to an end of said another metallic tube.

14. A fitting for a fluid conduit assembly, said fitting comprising a first part having means at one of its ends for connecting said fitting to another fluid conducting element, a second part located at the other end of said first part for attachment to a further fluid conducting element, said second part being disposed telescopingly with provision for limited movement at least axially relative to said first part, and means for independently attaching the interior of said first part with a fluid-tight seal to an end of a non-metallic fluid impervious tube where said non-metallic tube is sized to make a substantially snug fit within said second part and projects therefrom into said first part, said first and second part being configured such as to restrict, over the range of movement therebetween, the gap therebetween that is bridged by said non-metallic tube to prevent said non-metallic tube from being pinched in or extruded into said gap.

15. A fitting for a fluid conduit assembly in which the conduit includes at least a fluid impervious solid metallic tube, said fitting comprising a component part having means at one of its ends for connecting said fitting to another element, additional means located at the other end of said component part for attachment to an end of said metallic tube with a fluid-tight connection, said additional means comprising a metallic sleeve disposed with a loose sliding fit within a bore passing through said component part, means interconnecting said sleeve with said component part for providing limited movement at least axially therebetween and comprising an annular member disposed within confronting grooves, one groove being on the inside of said bore and the other groove being on the outside of said sleeve with at least one of said grooves having a greater dimension in the direction axially of said component part than said annular member whereby limited axial movement is permitted between said sleeve and said component part, fluid sealing means disposed between said sleeve and said component part, and means for independently attaching the interior of said component part with a fluid-tight seal to an end of a non-metallic fluid impervious tube where said non-metallic tube is sized to make a substantially snug fit within said metallic sleeve and projects therefrom into said component part.

16. A fitting according to claim 15, wherein said fluid sealing means comprises an elastomeric O-ring.

17. A fitting according to claim 15, wherein said metallic sleeve has an end facing outwardly from said bore which end is constructed and arranged to be attached to said metallic tube by brazing or the like.

18. A fitting according to claim 17, wherein said outwardly facing end of said sleeve is constructed and arranged to project from said component part, and indicia means are provided on said sleeve near said projecting end for indicating proper installation when a conduit assembly with said fitting attached is installed between two substantially fixed connecting points.

19. A fitting according to claim 15, wherein said means possessed by said component part for connecting said fitting to another element comprises a fitting end constructed and arranged to be attached to another metallic tube by brazing or the like.

20. A fitting according to claim 15, wherein a section of a non-metallic fluid impervious tube is disposed within both said metallic sleeve and said component part with one end of said tube secured to the interior of said component part by said means for attaching said component part thereto, and said metallic sleeve is provided with means attaching to its interior with a fluid-tight seal the opposite end of said non-metallic tube.

21. A fitting according to claim 15, wherein said metallic sleeve has an end facing outwardly from said bore which end is constructed and arranged to be attached to said metallic tube and to project from said component part, and indicia means are provided on said sleeve near said projecting end for indicating proper installation when a conduit assembly with said fitting attached is installed between two substantially fixed connecting points.

22. A fitting for a fluid conduit assembly in which the conduit includes at least a fluid impervious solid metallic tube, said fitting comprising a component part having means at one of its ends for connecting said fitting to another element, additional means located at the other end of said component part for attachment to an end of said metallic tube with a fluid-tight connection, said additional means comprising a metallic sleeve disposed with a loose sliding fit within a bore passing through said component part and having an end facing outwardly from said bore which end is constructed and arranged to be attached to said metallic tube and to project from said component part, indicia means provided on said sleeve near said projecting end for indicating proper installation when a conduit assembly with said fitting attached is installed between two substantially fixed connecting points, means interconnecting said sleeve with said component part for limited movement at least axially therebetween, fluid sealing means disposed between said sleeve and said component part, and means for independently attaching the interior of said component part with a fluid-tight seal to an end of a non-metallic fluid impervious tube where said non-metallic tube is sized to make a substantially snug fit within said metallic sleeve and projects therefrom into said component part.

23. A fitting according to claim 22, wherein said outwardly facing end of said metallic sleeve is constructed and arranged to be attached to said metallic tube by brazing or the like.

24. A fluid conduit assembly comprising a fluid conduit with end fittings at opposite ends, said conduit including at least two snug-fitting concentric tubes each of which is independently impervious to fluid, the outermost tube being solid metallic and the innermost tube being non-metallic, and each of said end fittings has first and second component parts joined, respectively, to a different one of both of said tubes with a separate fluid-tight seal therebetween, characterized in that said first and second component parts within each of said fittings are telescopingly interfitted tubular structures interconnected by means permitting limited movement at least axially therebetween, the second component parts being axially closest to and joined to the ends of said outermost tube and the first component parts being axially furthest from said outermost tube and joined to said innermost tube and provided with means for coupling to another fluid conducting element, and said innermost tube is free from corrugations but otherwise constructed and arranged to expand and contract axially to accommodate any axial movement within either of said end fittings between its respective first and second component parts caused by axial displacement of the corresponding end of said outermost tube relative to the adjacent coupled fluid conducting element when the conduit assembly is operatively installed, said first and second component parts being configured such as to restrict, over the range of movement therebetween, the gap therebetween that is bridged by said innermost tube to prevent said innermost tube from being pinched in or extruded into said gap.

25. A fluid conduit assembly according to claim 24, further characterized in that in each said fitting its respective first and second component parts are joined by means permitting limited angular movement therebetween, and said innermost tube is constructed and arranged to accommodate any such angular movement.

26. A fluid conduit assembly according to claim 25, further characterized in that said innermost tube is fabricated from a fluorocarbon resin and its ends are squeeezed each between two concentric members of a respective one of said fittings.

27. A fluid conduit assembly according to claim 24, further characterized in that said innermost tube is fabricated from a fluorocarbon resin and its ends are squeezed each between two concentric members of a respective one of said fittings.

28. A fluid conduit assembly according to claim 24, characterized in that each of said fittings has a first component part that surrounds the corresponding end of said innermost tube that extends from the corresponding end of said outermost tube, and has a second component part that surrounds said corresponding end of the innermost tube and is disposed telescopingly within said first component part with a sliding fit and fluid sealing means therebetween permitting said limited axial movement, said second component part being joined to said corresponding end of the outermost tube.

29. A fluid conduit assembly according to claim 28, further characterized in that said second component part fits within said first component part, and said fluid sealing means is constructed and arranged, such that limited angular movement is accommodated between said two component parts.

30. A fluid conduit assembly according to claim 29, further characterized in that said innermost tube is fabricated from a fluorocarbon resin and its ends are squeezed each between two concentric members of a respective one of said fittings.

31. A fluid conduit assembly according to claim 28, further characterized in that said innermost tube is fabricated from a fluorocarbon resin and its ends are squeezed each between two concentric members of a respective one of said fittings.

* * * * *